No. 694,996. Patented Mar. 11, 1902.
T. B. SAUER.
HOLDFAST.
(Application filed Dec. 29, 1900.)
(No Model.)
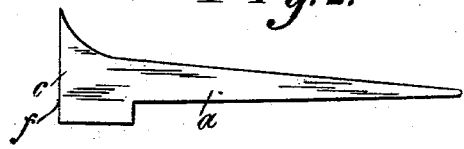
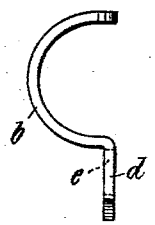
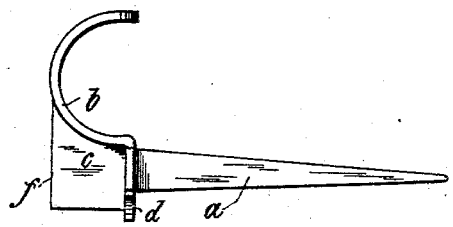
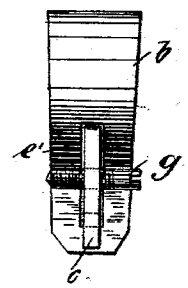
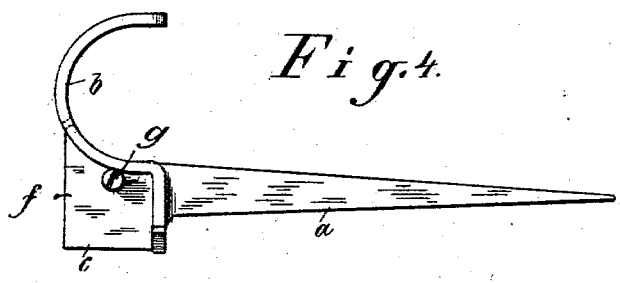
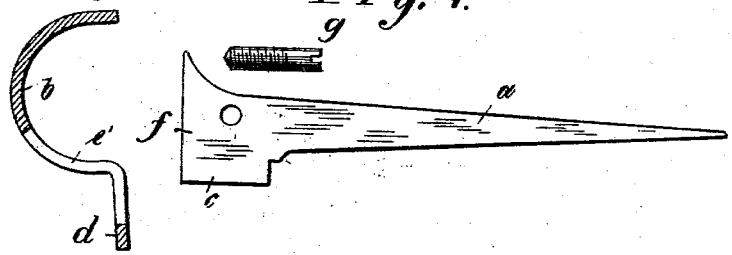
Witnesses.
Inventor:
T. B. Sauer.

UNITED STATES PATENT OFFICE.

THEODOR BONAVENTURA SAUER, OF OBER-REIFENBERG, GERMANY.

HOLDFAST.

SPECIFICATION forming part of Letters Patent No. 694,996, dated March 11, 1902.

Application filed December 29, 1900. Serial No. 41,534. (No model.)

*To all whom it may concern:*

Be it known that I, THEODOR BONAVENTURA SAUER, a subject of the King of Prussia, Emperor of Germany, residing at Ober-Reifenberg, in the Kingdom of Prussia and German Empire, have invented certain new and useful Improvements in Holdfasts, of which the following is a specification.

My present invention relates to improvements in holdfasts for pipes, &c.; and the object of my improvement is to enable such holdfasts to be driven into a wall or the like without danger of the holding part thereof being broken off or bent.

My improved holdfast comprises a hook part and a pipe-holding part. These parts are so constructed and arranged that on driving the holdfast the holding part is only pressed against the pipe when the hook has been driven quite into position.

In the accompanying drawings two examples of my improved holdfast are represented.

Figure 1 is a side elevation of the tube-holding part; Fig. 2, a side elevation of the hook part, and Fig. 3 a holdfast formed by the hook and holding part shown in Figs. 1 and 2. Fig. 4 represents a holdfast which differs somewhat in construction from that shown in Fig. 3. Fig. 5 is an end view of the second construction. Fig. 6 represents the holding part thereof in section, and Fig. 7 shows the hook and also a screw to be applied in the manner hereinafter described.

My holdfast, Fig. 3, comprises the parts $a$ and $b$. The hook part $a$ consists of a thin flat bar, which is tapered to a point. The head $c$ of this bar is so shaped that on passing the hook through the holding part the latter bears against this head. The holding part $b$ consists of a flat bar bent into a semicircular form for the greater portion of its length. In the straight part $d$ there is a hole $e$ to fit the upper end of the hook. The inner surface of the head of the hook has a shape corresponding to the form of the holding part, so that the latter when the hook is in position is held fast. On driving the hook it is struck on the end surface $f$.

In the construction illustrated in Figs. 4 to 7 provision is made to enable the holding part to be easily removed from the hook at any time after the holdfast has been driven into position. The parts $a$ and $b$ of this construction do not differ in exterior form from the same parts of the construction described above. The slot $e'$ in the part $d$ of this construction is made much longer than the hole $e$ in the former construction. In this construction the head $c$ of the hook $b$ can be passed through the slot $e'$ in either direction. A hole is provided in the head $c$ of the hook $a$, through which a pin or screw $g$ passes, and the back of the holding part presses against this pin, while the lower end of the straight part of $b$ bears against the head of the hook. This construction is used as follows: After the part $b$ has been placed on the end of the hook and the screw or pin $g$ has been inserted the hook $a$ is driven into the wall or the like until the part $b$ incloses the pipe. If now it is desired at any time to remove the pipe, it is only necessary to remove the pin or screw $g$, whereupon the part $b$ of the holdfast can be easily taken off and the pipe removed. A new pipe can then be fastened in position, if desired.

It is of course not necessary to drive the hook, with the part $b$ thereon, into position, as the latter can be fitted onto the former at any time after driving the hook.

What I claim, and desire to secure by Letters Patent of the United States, is—

1. A holdfast comprising two parts, a hook part and a holding part, the hook part being adapted to be passed through an opening in the holding part, to hold the latter against the body to be supported, and the hook part having a shoulder for engagement with the holding part to prevent dislodgment of the latter.

2. A holdfast comprising a hook part and a holding part, the holding part being slotted longitudinally to receive the hook part, the hook part having a shoulder to engage the holding part, the hook of the hook part being adapted to lie with its inner face flush with that of the holding part, and a screw passed through the hook part, to prevent displacement of the holding part.

3. A holdfast comprising a hook part and a holding part, the hook part comprising a tapering bar having a projecting head, the holding part comprising a semicircular plate having a flat portion extended at right angles thereto and being slotted longitudinally to receive the hook part, the hook part having a shoulder to engage the holding part, the hook of the hook part being adapted to lie with its inner face flush with that of the holding part, and a screw passed through the hook part, to prevent displacement of the holding part.

In testimony whereof I have hereunto set my hand in the presence of two witnesses.

THEODOR BONAVENTURA SAUER.

Witnesses:
JOHANN ANTON GEORG MYCHENER,
JEAN GRUND.